(12) United States Patent
Wang

(10) Patent No.: US 8,447,118 B2
(45) Date of Patent: May 21, 2013

(54) METHOD OF CIPHER AND PICTURE CIPHER SYSTEM

(75) Inventor: Jhao-Ming Wang, Taipei (TW)

(73) Assignee: Inventec Corporation, Taipei (TW)

( * ) Notice: Subject to any disclaimer, the term of this patent is extended or adjusted under 35 U.S.C. 154(b) by 337 days.

(21) Appl. No.: 12/973,921

(22) Filed: Dec. 21, 2010

(65) Prior Publication Data

US 2012/0128258 A1    May 24, 2012

(30) Foreign Application Priority Data

Nov. 24, 2010  (TW) .............................. 99140574 A

(51) Int. Cl.
*G06K 9/68* (2006.01)
(52) U.S. Cl.
USPC .......................................... 382/218; 713/184
(58) Field of Classification Search ....................... None
See application file for complete search history.

(56) References Cited

U.S. PATENT DOCUMENTS

| 6,209,104 B1 * | 3/2001 | Jalili ................................ 726/18 |
| 6,934,860 B1 * | 8/2005 | Goldstein ...................... 713/183 |
| 2010/0169958 A1 * | 7/2010 | Werner et al. .................... 726/6 |

FOREIGN PATENT DOCUMENTS

| TW | 299410 | 3/1997 |
| TW | 515188 | 12/2002 |
| TW | 541502 | 7/2003 |

OTHER PUBLICATIONS

Rachna Dhamija and Adrian Perrig, "De'ja' Vu: A User Study Using Images for Authentication", Aug. 2000, In Proceedings of the 9th USENIX Security Symposium.*
Wazir Zada Khan, Mohammed Y. Aalsalem, and Yang Xiang, "A graphical Password Based System for Small Mobile Devices", Sep. 2011, IJCSI International Journal of Computer Science Issues, vol. 8, Issue 5, No. 2.*

* cited by examiner

*Primary Examiner* — Andrew W Johns
*Assistant Examiner* — Siamak Harandi
(74) *Attorney, Agent, or Firm* — Jianq Chyun IP Office

(57) ABSTRACT

A design method of cipher is provided. First, a database with a plurality of picture units is provided. Then, a part of the picture units of the database are selected to form a passing picture, and the passing picture is transferred to an encoder. The encoder selects at least parts of the picture units of the database to form a plurality of option pictures, in which a part of the picture units of the option pictures correspond with the picture units of the passing picture. A picture cipher system is also provided.

13 Claims, 7 Drawing Sheets

METHOD OF CIPHER AND PICTURE CIPHER SYSTEM

CROSS-REFERENCE TO RELATED APPLICATION

This application claims the priority benefit of Taiwan application serial no. 99140574, filed on Nov. 24, 2010. The entirety of the above-mentioned patent application is hereby incorporated by reference herein and made a part of specification.

BACKGROUND OF THE INVENTION

1. Field of the Invention

The present invention generally relates to a design method of cipher and a cipher system, in particular, to a design method of picture cipher and a picture cipher system.

2. Description of Related Art

Recently, along with the ever improving technology, various electronic devices have mushroomed, such as mobile phones with storage functions, Personal Digital Assistants (PDAs), Tablet PCs, and notebook computers. Along with the popularization of digital devices, how to ensure the security of data in the digital devices is gradually emphasized. The conventional identity recognition method is adopting a mechanism of inputting an identification account and a password. However, this method requires the user to remember the account and the password, and is much inconvenient for the user. Especially, when the user uses different devices, passwords required to be remembered are increased accordingly, and thus the user tends to forget the accounts and the passwords accordingly.

SUMMARY OF THE INVENTION

Accordingly, the present invention is directed to a design method of cipher and a picture cipher system, which use picture cipher to provide convenient use for users and have better security.

An embodiment of the present invention provides a design method of cipher. First, a database with a plurality of picture units is provided. A part of the picture units of the database are selected to form a passing picture, and the passing picture is transferred to an encoder. The encoder selects at least parts of the picture units of the database to form a plurality of first option pictures, in which a part of the picture units of the first option pictures correspond with the picture units of the passing picture.

An embodiment of the present invention provides a picture cipher system, which includes a storing module, an inputting module, an encoding module, and a decoding module. The storing module is suitable for storing a database with a plurality of picture units. The inputting module is coupled to the storing module. The inputting module is suitable for selecting a plurality of picture units from the database to generate a passing picture, and transferring the passing picture to the storing module. The encoding module is coupled to the storing module. The encoding module selects at least parts of the picture units from the database according to the passing picture in the storing module, so as to form a plurality of first option pictures and transfer the first option pictures to the storing module, in which the number of the picture units of the first option pictures is larger than the number of the picture units of the passing picture, and the picture units of the passing picture correspond with a part of the picture units of the first option pictures. The decoding module is coupled to the storing module and the inputting module. The inputting module is suitable for selecting at least one of the first option pictures and transferring the at least one first option picture to the decoding module, and the decoding module compares and determines whether the picture units of the passing picture correspond with a part of the picture units of the selected at least one first option picture.

In an embodiment of the present invention, at least one of the first option pictures includes the picture units of the passing picture.

In an embodiment of the present invention, a part of the first option pictures each include one of the picture units of the passing picture.

In an embodiment of the present invention, the method further includes selecting at least one of the option pictures and transferring the at least one option picture to a decoder. The decoder compares and determines whether the picture units of the passing picture correspond with a part of the picture units of the selected at least one option picture.

In an embodiment of the present invention, when the picture units of the passing picture do not correspond with a part of the picture units of the selected at least one option picture, the encoder selects the picture units of the database once again to form a plurality of second option pictures, and a part of the picture units of the second option pictures correspond with the picture units of the passing picture.

In an embodiment of the present invention, the number of the second option pictures is larger than or equal to the number of the first option pictures.

In an embodiment of the present invention, the picture units of the database are divided into a plurality of categories, and each category includes a plurality of picture units. The picture units of the passing picture are respectively of the same category with at least one of the picture units of the first option pictures.

In an embodiment of the present invention, when the decoder compares and determines whether the picture units of the passing picture correspond with a part of the picture units of the selected at least one option picture, the decoder determines whether the picture units of the same category are correspond with each other.

In view of the above, in the embodiments of the present invention, by changing the conventional character cipher into pictures and combinations thereof, the user is enabled to select the cipher more intuitively. Therefore, the burden of the user when using the cipher system is effectively reduced, and the cipher system is hard to be embezzled, thus having a better security.

To make the features and advantages of the present invention more comprehensible, embodiments are illustrated herein below in detail together with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
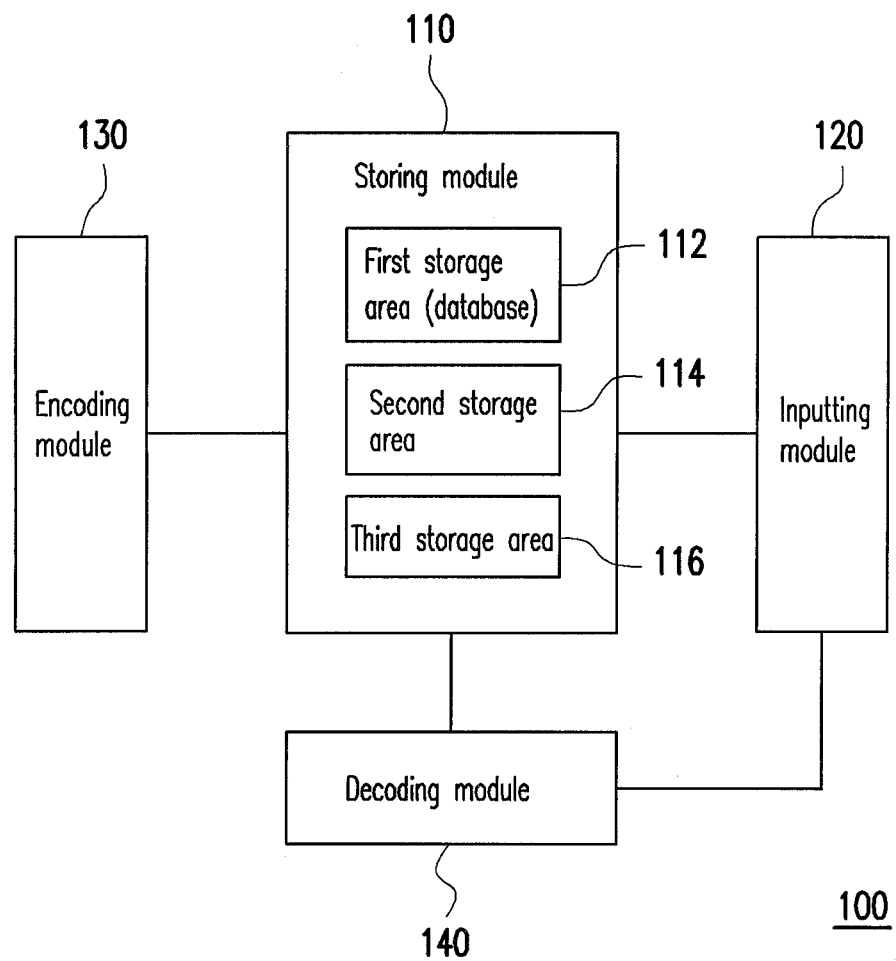
FIG. 1 is a block diagram of a picture cipher system according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
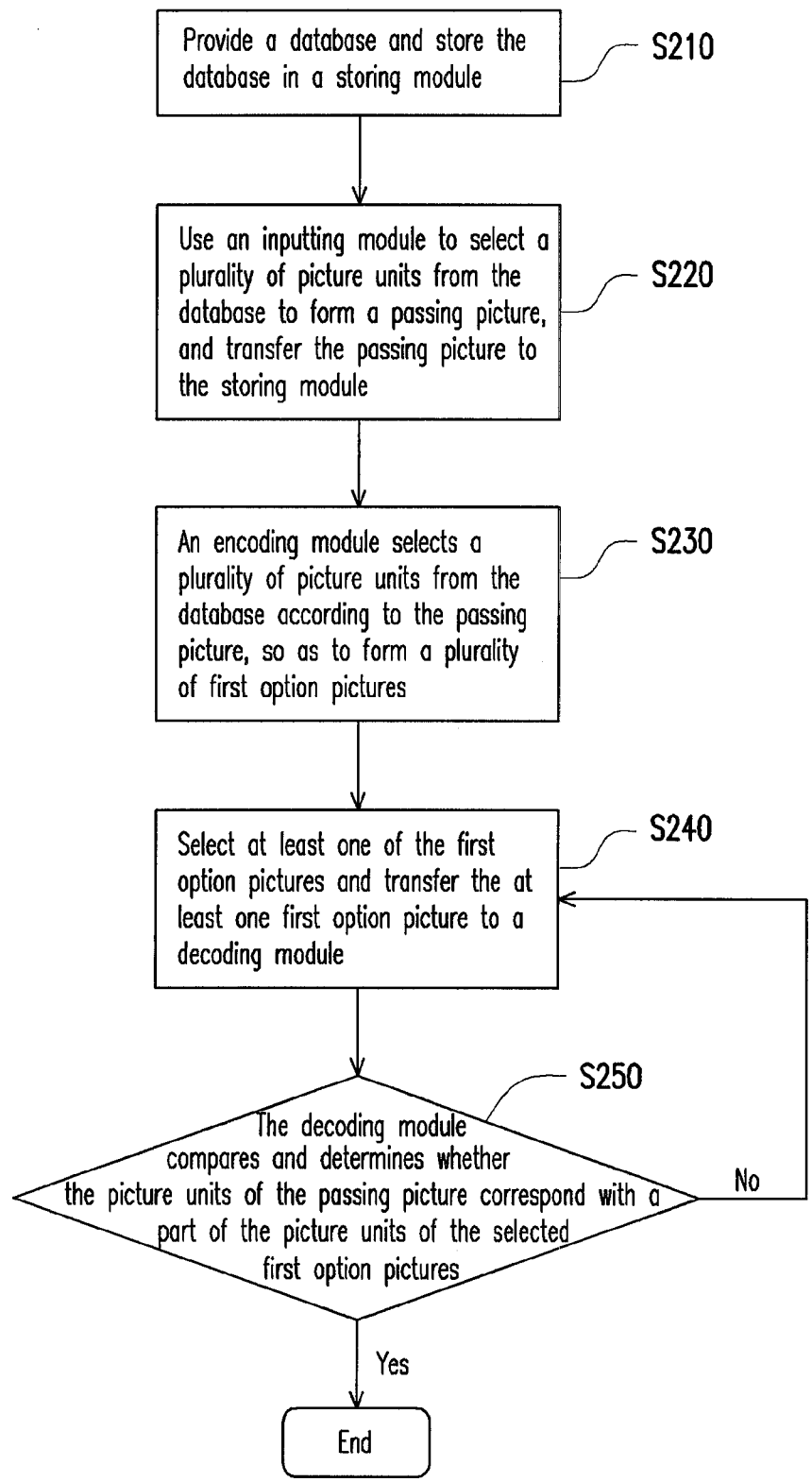
FIG. 2 is a flow chart of the picture cipher system in FIG. 1.

FIG. 1 is a block diagram of a picture cipher system according to an embodiment of the present invention. FIG. 2 is a flow chart of the picture cipher system in FIG. 1. Referring to FIG. 1 and FIG. 2 together, in this embodiment, a picture cipher system 100 is applicable to an electronic device (not shown), so as to generate a security function for the data in the electronic device. For example, the picture cipher system 100 is applied in a boot loader of a computer, so as to recognize the identity of a user. However, the present invention is not limited thereto.

In this embodiment, the picture cipher system 100 includes a storing module 110, an inputting module 120, an encoding module 130, and a decoding module 140. The encoding module 130 and the decoding module 140 may be integrated in a controller (not shown); however, in order to distinguish the functions thereof, the two are described separately. The storing module 110 includes a first storage area 112, a second storage area 114, and a third storage area 116, the inputting module 120 and the encoding module 130 are respectively coupled to the storing module 110, and the decoding module 140 is coupled to the storing module 110 and the inputting module 120 simultaneously.

In step S210 of this embodiment, a database is provided and stored in the first storage area 112 of the storing module 110, and the database is provided with a plurality of picture units. In step S220, a user may use the inputting module 120 to select a plurality of picture units from the database to form a passing picture, and transfer the passing picture to the second storage area 114 of the storing module 110. In step S230, the encoding module 140 adopts a rule to select a plurality of picture units from the database according to the passing picture, so as to form a plurality of first option pictures, and enables that the picture units of the passing picture correspond with a part of the picture units of the first option pictures. Herein, the number of the picture units in the passing picture, the number of the first option pictures and the number of the picture units contained therein, and the rule adopted for forming the first option pictures are not limited, and any system or method applicable for operating ciphers is available in this embodiment.

Further, when the user intends to remove the cipher system, in step S240, at least one of the first option pictures is selected and transferred to the decoding module, and in step S250, the decoding module 140 compares and determines whether the picture units of the passing picture correspond with a part of the picture units in the selected first option picture. When the two correspond with each other, the protection effect to the electronic device is removed and the picture cipher system 100 is ended, so as to perform operation on the electronic device continuously. However, if the two do not correspond with each other, the procedure returns to the step S230, and the encoding module 130 generates new first option pictures for the user to select once again.

Several embodiments are described below to illustrate the implementations of the above procedure. However, the present invention is not limited to the following embodiments.

Figure 3A:
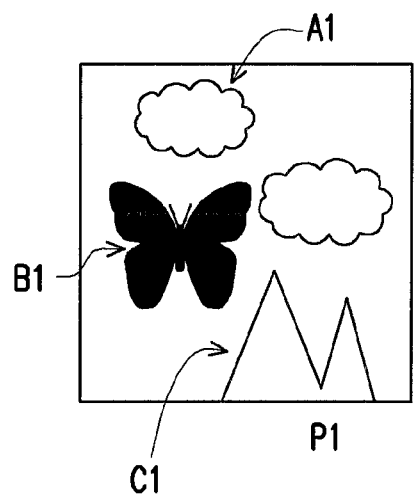
FIG. 3A and FIG. 3B are schematic views of implementations of an operation procedure of FIG. 2.
Figure 3B:
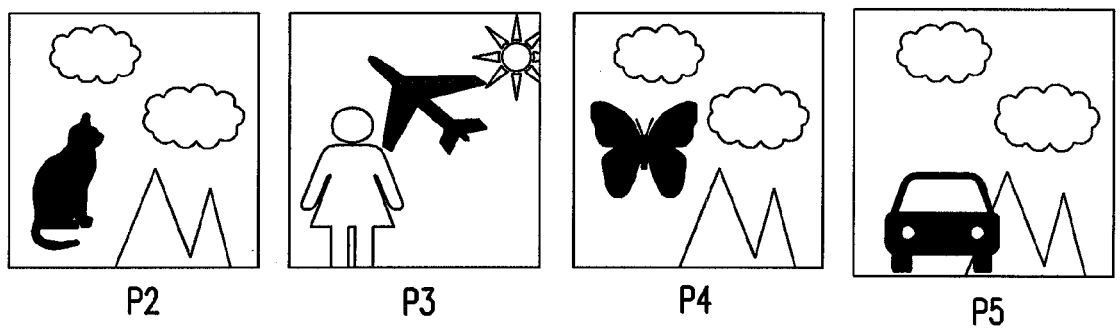

FIG. 3A and FIG. 3B are schematic views of implementations of an operation procedure of FIG. 2. Referring to FIG. 2, FIG. 3A, and FIG. 3B, for example, first the user uses the inputting module 120 to select three picture units A1, B1, and C1 from the database of the first storage area 112, so as to form a passing picture P1 as shown in FIG. 3A. Then, the encoding module 140 selects a plurality of picture units from the database to form four first option pictures P2-P5 as shown in FIG. 3B for the user to select. Accordingly, the user selects through determination the option picture P4 that corresponds with the passing picture P1 in FIG. 3A.

Figure 4:
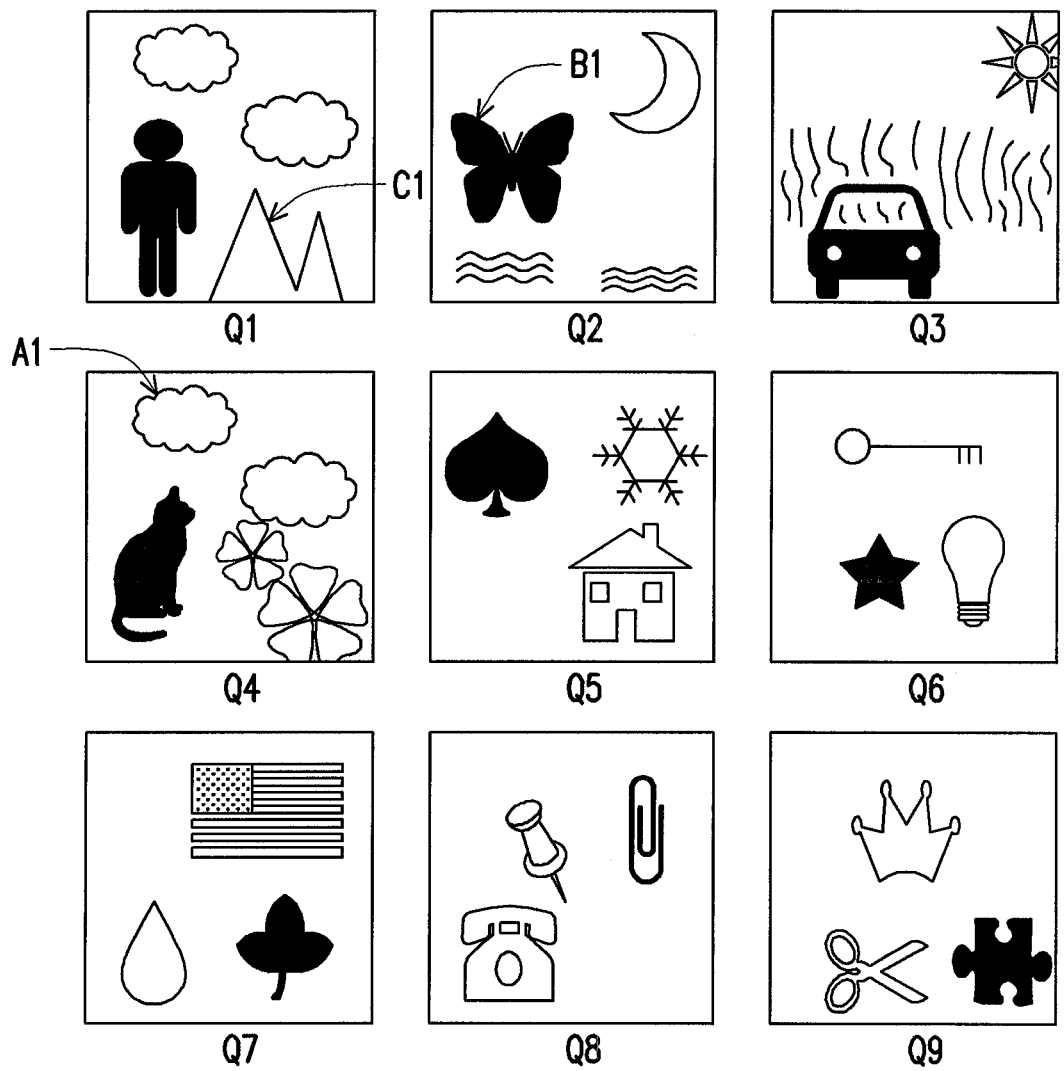
FIG. 4 is a schematic view of first option pictures in a picture cipher system according to another embodiment of the present invention.

Furthermore, the arrangement and configuration manners of the picture units serving as the passing picture in the option pictures are not limited in the present invention. FIG. 4 is a schematic view of first option pictures in a picture cipher system according to another embodiment of the present invention. Herein, the operation rule of the picture cipher system 100 may be changed as that a part of the first option pictures each have only one picture unit that corresponds with the passing picture P1. That is to say, in this embodiment, the user needs to select from the first option pictures Q1-Q9 the first option pictures Q1, Q2, and Q4 having the picture units A1, B1, and C1 of the passing picture P1, so as to achieve the effect of removing the cipher. Therefore, it can be further deduced that in another embodiment of the present invention that is not shown, the picture units A1, B1, and C1 that correspond with the passing picture P1 may also be distributed in two option pictures among the first option pictures Q1-Q9 (for example, the picture units A1 and B1 are configured in the first option picture Q1, and the picture unit C1 is configured in the first option picture Q6), thus achieving the same effect as described above and increasing the variety of the cipher.

Figure 5A:
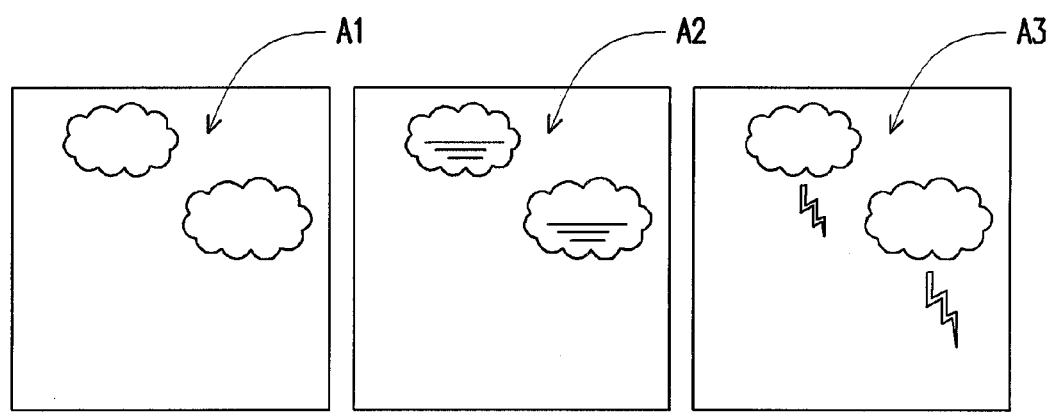
FIG. 5A is a schematic view of a part of picture units in a database of a picture cipher system according to another embodiment of the present invention.
Figure 5B:
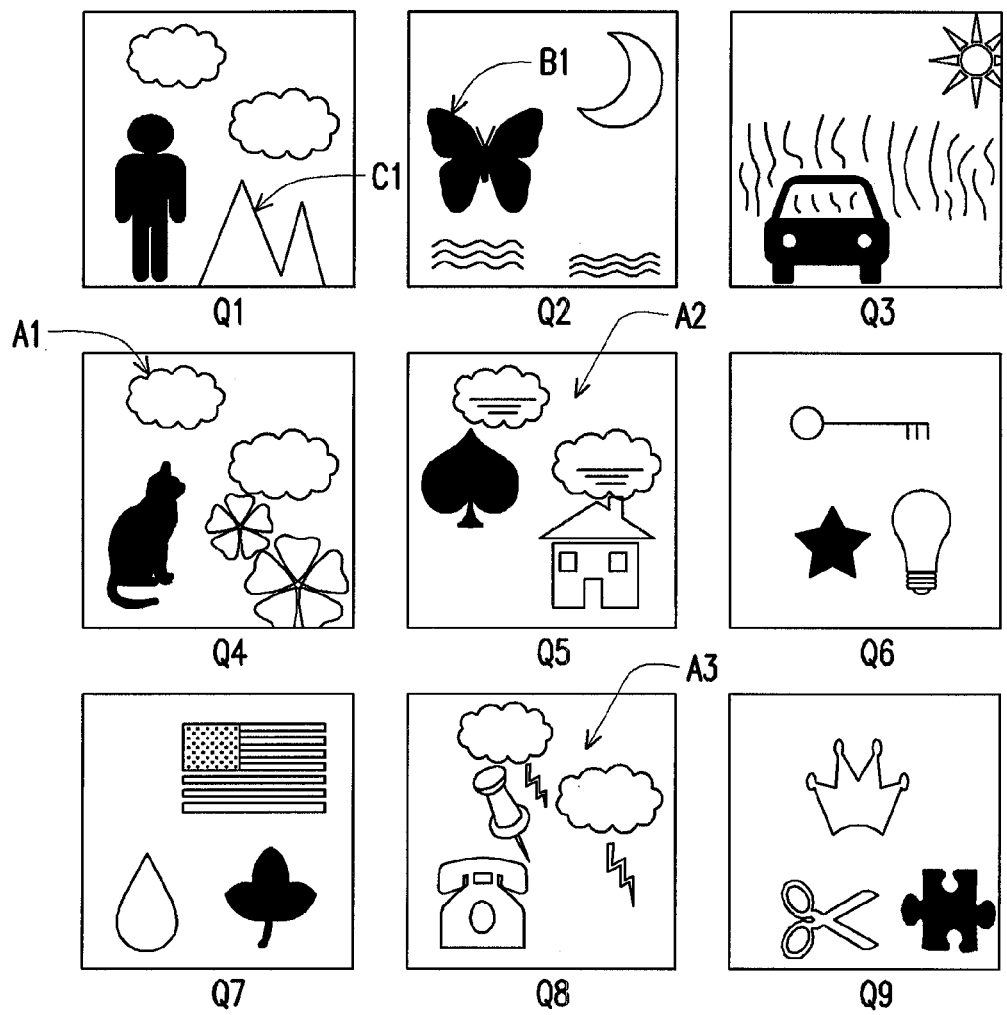
FIG. 5B shows first option pictures formed with the picture units of FIG. 5A.

In addition, FIG. 5A is a schematic view of a part of picture units in a database of a picture cipher system according to another embodiment of the present invention. FIG. 5B shows first option pictures formed with the picture units in FIG. 5A. Referring to FIG. 5A and FIG. 5B, in this embodiment, to enable the picture cipher system 100 have more variety, the picture units in the database may be divided into a plurality of categories, and each category includes a plurality of picture units. In other words, by partially changing the profile of each picture unit or deriving from definitions of the picture units, different picture units of the same category may be created, thereby improving the variety of the database. Herein, FIG. 5A shows different picture units A1, A2, and A3 of the same category.

In this embodiment, the decoding module 140 may have different results on the first option pictures selected by the inputting module 120 according to rule changes due to the divided categories. For example, in the step S240 of FIG. 2, the picture units contained in the first option pictures selected by the user must be completely the same as the picture units of the passing picture P1 in the FIG. 3A, such that in the step S250 the decoding module 140 determines that the two correspond with each other. In contrast, the determination rule can be changed, and the user may only select the picture units of the same category with the picture units in the passing picture P1, such that the determination of the decoding module 140 can be passed in the step S250. For example, the user may select in FIG. 5B the first option pictures Q1, Q2, and Q4, the first option pictures Q1, Q2, and Q5, or the first option pictures Q1, Q2, and Q8, so as to enable the decoding module 140 consider to correspond with the passing picture P1.

Accordingly, changing references adopted by the picture units of the same category are not limited in this embodiment, and any measure capable of increasing the variety of the picture units in the database is available in the present invention.

Figure 6:
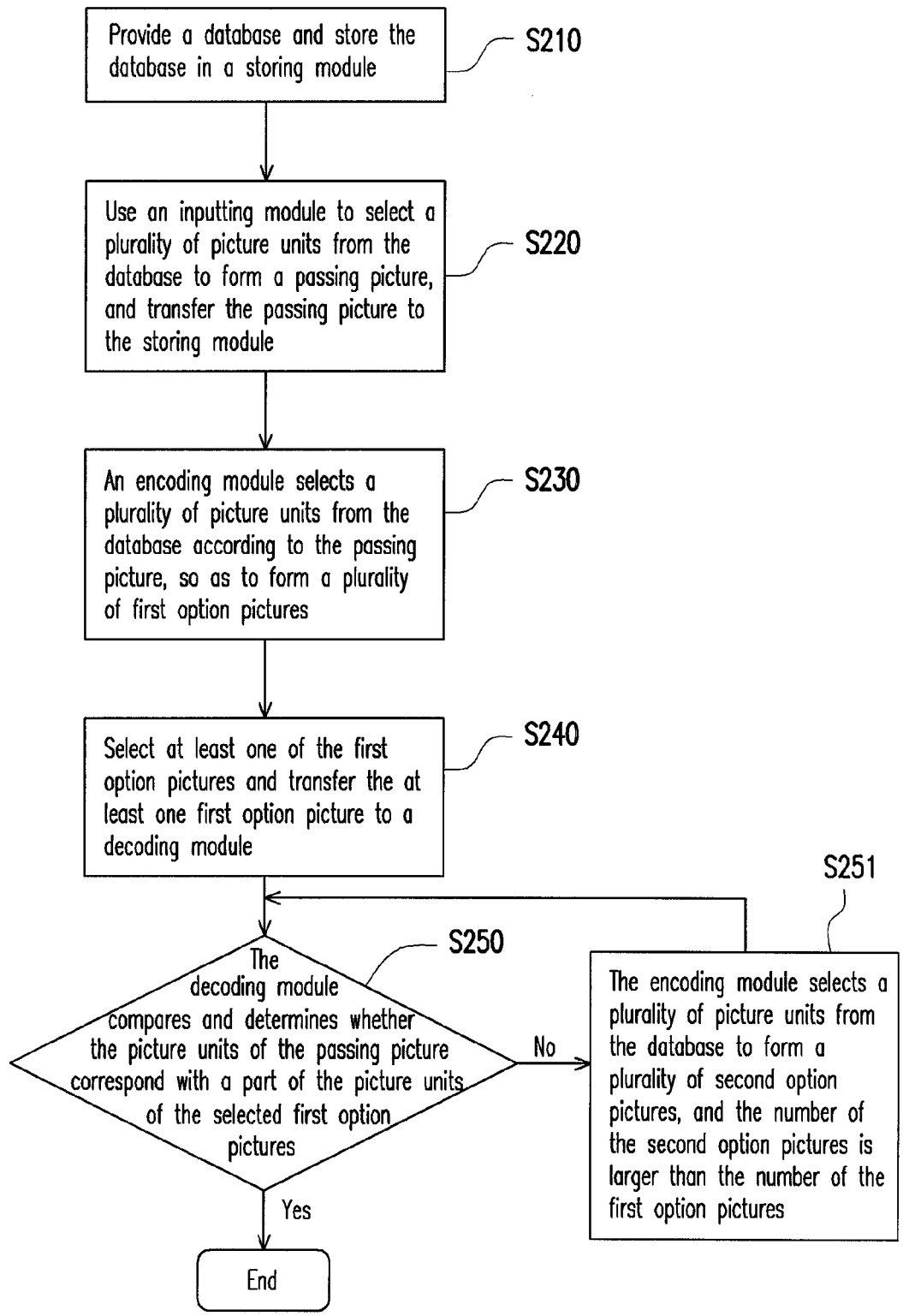
FIG. 6 is a flow chart of a picture cipher system according to another embodiment of the present invention.

FIG. 6 is a flow chart of a picture cipher system according to another embodiment of the present invention. Referring to FIG. 6, different from the above embodiment, in step S251, when the picture units of the passing picture P1 do not completely correspond with a part of the picture units of the selected first option pictures, the encoding module 130 selects a plurality of picture units from the database once again to from a plurality of second option pictures. It should be noted that, the number of the second option pictures is larger than the number of the previous first option pictures. In other words, each time when the user fails to pass the determination rule of the decoding module 140, the encoding module 130 increases the number of the option pictures, so as to complicate the picture cipher system 100.

In view of the above, in the above embodiments of the present invention, by changing the conventional character cipher into pictures and combinations thereof, the user is enabled to select the cipher more intuitively. Moreover, the arrangement combinations of the picture units and the encoding rules of the encoding module are changed, thus increasing the complexity of the picture cipher system more effectively. Therefore, the burden of the user when using the cipher system is effectively reduced, and the cipher system is hard to be embezzled, thus having a better security.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A design method of cipher, comprising:
   providing a database, wherein the database is provided with a plurality of picture units;
   selecting a part of the picture units of the database to form a passing picture;
   transferring the passing picture to an encoder; and
   the encoder selecting at least parts of the picture units of the database to form a plurality of first option pictures, wherein a part of the picture units of the first option pictures correspond with the picture units of the passing picture.

2. The design method of cipher according to claim 1, wherein at least one of the first option pictures comprises the picture units of the passing picture.

3. The design method of cipher according to claim 2, wherein the part of the first option pictures each comprise one of the picture units of the passing picture.

4. The design method of cipher according to claim 1, further comprising:
   selecting at least one of the option pictures and transferring the at least one option picture to a decoder; and
   the decoder comparing and determining whether the picture units of the passing picture correspond with a part of the picture units of the selected at least one option picture.

5. The design method of cipher according to claim 4, further comprising:

when the picture units of the passing picture do not correspond with a part of the picture units of the selected at least one option picture, the encoder selecting the picture units of the database once again to form a plurality of second option pictures, wherein a part of the picture units of the second option pictures correspond with the picture units of the passing picture.

6. The design method of cipher according to claim 5, wherein the number of the second option pictures is larger than or equal to the number of the first option pictures.

7. The design method of cipher according to claim 6, wherein the picture units of the database are divided into a plurality of categories, each category comprises a plurality of picture units, and the picture units of the passing picture are respectively of the same category with at least one of the picture units of the first option pictures.

8. The design method of cipher according to claim 7, wherein when the decoder compares and determines whether the picture units of the passing picture correspond with a part of the picture units of the selected at least one option picture, the decoder determines whether the picture units of the same category are correspond with each other.

9. A picture cipher system, comprising:
   a storing module, suitable for storing a database provided with a plurality of picture units;
   an inputting module, coupled to the storing module, and suitable for selecting a plurality of picture units from the database to generate a passing picture, and transferring the passing picture to the storing module;
   an encoding module, coupled to the storing module, for selecting at least parts of the picture units from the database according to the passing picture in the storing module to form a plurality of first option pictures, and transferring the first option pictures to the storing module, wherein the number of the picture units of the first option pictures is larger than the number of the picture units of the passing picture, and the picture units of the passing picture correspond with a part of the picture units of the first option pictures; and
   a decoding module, coupled to the storing module and the inputting module, wherein the inputting module is suitable for selecting at least one of the first option pictures to transfer the at least one first option picture to the decoding module, and the decoding module compares and determines whether the picture units of the passing picture correspond with a part of the picture units of the selected at least one first option picture.

10. The picture cipher system according to claim 9, wherein when the picture units of the passing picture do not correspond to a part of the picture units of the selected at least one option picture, the encoding module selects the picture units from the database of the storing module once again to form a plurality of second option pictures, and the picture units of the passing picture correspond with a part of the picture units of the second option pictures.

11. The picture cipher system according to claim 10, wherein the number of the second option pictures is larger than or equal to the number of the first option pictures.

12. The picture cipher system according to claim 9, wherein at least one of the first option pictures comprises the picture units of the passing picture.

13. The picture cipher system according to claim 12, wherein the part of the first option pictures each comprise one of the picture units of the passing picture.

* * * * *